(12) United States Patent
McClelland et al.

(10) Patent No.: US 11,443,317 B2
(45) Date of Patent: Sep. 13, 2022

(54) TRACING FLOW OF TAGGED FUNDS ON A BLOCKCHAIN

(71) Applicant: Salt Blockchain, Inc., Denver, CO (US)

(72) Inventors: Keagan McClelland, Denver, CO (US); Matthew Hill, Centennial, CO (US); Aiden McClelland, Denver, CO (US)

(73) Assignee: SALT BLOCKCHAIN INC., Denver, CO (US)

( * ) Notice: Subject to any disclaimer, the term of this patent is extended or adjusted under 35 U.S.C. 154(b) by 196 days.

(21) Appl. No.: 16/544,770

(22) Filed: Aug. 19, 2019

(65) Prior Publication Data

US 2020/0202358 A1    Jun. 25, 2020

Related U.S. Application Data

(60) Provisional application No. 62/782,341, filed on Dec. 19, 2018.

(51) Int. Cl.
*G06Q 20/40* (2012.01)
*G06Q 20/38* (2012.01)

(52) U.S. Cl.
CPC ....... *G06Q 20/4016* (2013.01); *G06Q 20/389* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 10,460,320 | B1 * | 10/2019 | Cao | G06Q 20/4016 |
| 2018/0040064 | A1 * | 2/2018 | Grigg | G06Q 20/4016 |
| 2018/0240107 | A1 * | 8/2018 | Andrade | G06Q 20/4016 |
| 2018/0285840 | A1 * | 10/2018 | Hasan | G06Q 20/0655 |
| 2019/0073647 | A1 * | 3/2019 | Zoldi | G06Q 20/383 |
| 2019/0172067 | A1 * | 6/2019 | Arora | G06Q 20/4016 |

(Continued)

FOREIGN PATENT DOCUMENTS

| | | | | |
|---|---|---|---|---|
| WO | WO-2019136414 A1 * | 7/2019 | | G06N 5/003 |
| WO | WO-2020242550 A1 * | 12/2020 | | G06F 21/64 |

OTHER PUBLICATIONS

Antonopolous, A., Mastering Bitcoin, Chapter 6 "Transactions," accessed Jan. 2, 2020 at https://github.com/bitcoinbook/bitcoinbook/blob/develop/ch06.asciidoc.

(Continued)

*Primary Examiner* — Jacob C. Coppola
(74) *Attorney, Agent, or Firm* — Perkins Coie LLP

(57) ABSTRACT

A system for "tagging" funds identified on a blockchain and associating a weight value therewith. The tagging profile is developed into a propagation profile wherein weight values are inherited from the tagging profile s. Propagation profile funds may be diluted by combining with non-tagged funds, similar to how ink dilutes through water. A spending history of funds of interest is developed based on replaying the funds of interest against the global transaction history of the blockchain. It is determined whether the spending history intersects with the propagation profile, thus determining how closely the two sources of funds are economically to one another. Intersection triggers actions including alert notifications or transfer of funds on the blockchain.

12 Claims, 12 Drawing Sheets

(56) References Cited

U.S. PATENT DOCUMENTS

| | | | |
|---|---|---|---|
| 2019/0295085 A1* | 9/2019 | Ashiya | G06Q 20/4016 |
| 2019/0295087 A1* | 9/2019 | Jia | G06Q 20/4016 |
| 2020/0167791 A1* | 5/2020 | Eller | G06Q 20/367 |
| 2020/0380520 A1* | 12/2020 | Kavali | G06Q 20/4016 |

OTHER PUBLICATIONS

Nakamoto, S., Bitcoin: A Peer-to-Peer Electronic Cash System (2009), accessed Jan. 2, 2020, at https://bitcoin.org/bitcoin.pdf.

Ouaddah, A., Towards a Novel Privacy-Preserving Access Control Model Based on Blockchain Technology in IoT, Advances in Intelligent Systems and Computing, Sep. 2017, accessed Jan. 2, 2020, at https://www.researchgate.net/publication/308567618_Towards_a_Novel_Privacy-Preserving_Access_Control_Model_Based_on_Blockchain_Technology_in_IoT.

Ober, M., Structure and Anonymity of the Bitcoin Transaction Graph, May 7, 2013, Future Internet 2013, 5, 237-250.

Buterin, V., MtGox: What the largest exchange is doing about the Linode theft and the implications, Bitcoin Magazine, Mar. 28, 2012, accessed Jan. 2, 2020, at https://bitcoinmagazine.com/articles/mtgox-the-bitcoin-police-what-the-largest-exchange-is-doing-about-the-linode-theft-and-the-implications-1337616444.

Hill, K., Sanitizing Bitcoin: This Company Wants To Track 'Clean' Bitcoin Accounts, Nov. 13, 2013, accessed Jan. 2, 2020, at https://www.forbes.com/sites/kashmirhill/2013/11/13/sanitizing-bitcoin-coin-validation/#4a3b818f4e0f.

* cited by examiner

TRACING FLOW OF TAGGED FUNDS ON A BLOCKCHAIN

BACKGROUND OF THE INVENTION

Blockchains are shared ledgers that are periodically updated according to a set of network consensus rules. Some blockchain shared ledgers track the movement of funds (e.g., units of monetary value that may be viewed as being "coins" or units of cryptocurrency). Participants in the blockchain network may choose to conduct business (e.g., provide goods and/or services) in exchange for these units of funds. In some cases, network participants may wish to avoid certain "tainted" units of funds for business and/or regulatory reasons (e.g., if the funds are suspected of having been stolen, if the funds are associated with a legal jurisdiction in which the network participant is not authorized to do business, if the funds have been associated with terrorist or other criminal activity, if the funds are associated with a known credit risk, etc.). There could be legal requirements in certain jurisdictions to check blockchain funds against lists of known bad funds (e.g., stolen, used for terrorism, associated with a country subject to economic sanctions, etc.) before accepting the funds in the course of business.

Some blockchains are based on an unspent transaction output (UTXO) model wherein units of funds are discrete and not fractionally spendable, similar to physical paper bills of a fiat currency. When spending a UTXO, there is likely to be at least one "change" output associated with the transaction since it is unlikely that the size of a UTXO exactly matches the amount the spender wishes to transfer. Thus, knowledge of a particular tainted UTXO becomes stale when the UTXO is spent and the tainted funds are split between a recipient and a change address controlled by the spending entity. A blockchain network participant is therefore unlikely to be able to follow the movement of funds and accurately determine whether a particular unit of funds should not be accepted for business purposes. Moreover, tainted funds can be combined with "clean" funds, thus complicating the question of whether a network participant may accept a payment.

Accordingly, there is a need for a system to track movement of tainted or otherwise classified funds over time on a blockchain for a network participant to determine whether it is permissible to handle a particular unit of funds (e.g., the output of a particular UTXO) according to the network participant's criteria.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
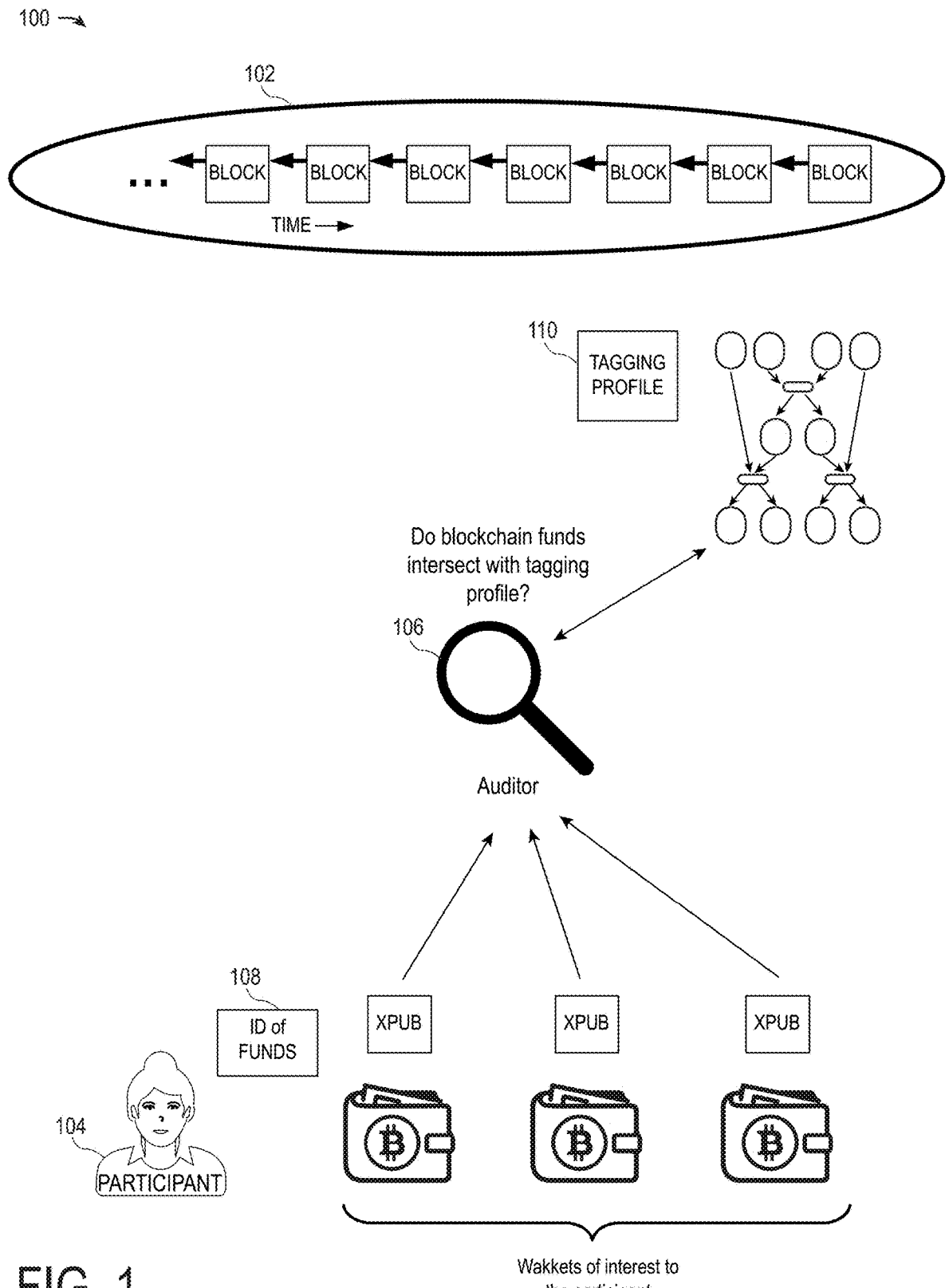
FIG. 1 is an example block diagram of an example relationship between a source of funds and an auditor tracing the flow those funds with respect to a tagging profile on a blockchain.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A participant in a blockchain network may be aware of funds of interest and may wish to track the funds over time. The funds of interest may be funds that the participant does not wish to interact with (e.g., for legal reasons, regulatory reasons, because the funds have been claimed as stolen, associated with a darknet market, etc.). The funds of interest may also be funds that are of economic interest, such as funds that have been associated with another market participant of interest (e.g., a competitor or any other entity exchanging goods or services for funds on the blockchain).

It is quite difficult to trace a source of funds on a UTXO blockchain due to the structure of the UTXO model. A UTXO represents a discrete amount of funds that can only be spent in full, similar to a physical paper currency bill. In the same way it is not possible to spend $10 by cutting a $20 bill in half, a UTXO must be fully spent. If a spender of funds on a UTXO blockchain wishes to transfer value to a recipient, then the spender must select one or more UTXOs, the aggregate value of which is greater than the transfer amount as inputs to a transaction. The spender's transaction typically will have two outputs: one output going to the recipient of the funds, and a second output controlled by the spender and referred to herein as a change output or change address.

If a blockchain network participant identifies a UTXO of interest (e.g., a UTXO having a "risk factor"), it is not effective to simply check the UTXO on the blockchain because, if the owner ever spends the UTXO, the funds contained therein effectively are moved partially to a recipient in a new UTXO and the remainder is held by the spender in a new UTXO change address. Without the aid of evidence extrinsic to the blockchain, it is likely not possible to distinguish between coins held by the recipient of the transaction and coins that are the change address, although it may be possible to apply heuristics or other analysis such as wallet clustering to identify the change address in some cases.

Accordingly, a method is disclosed herein that, given an initial tagging profile of funds, can follow the history of the funds against the global transaction history of the blockchain to determine whether there is an intersection between the funds and a weighted profile (e.g., a risk profile) of funds of interest. As funds are spent and combined with new transaction inputs, the weight values of the profile, referred to herein as a tagging profile, can be thought of like a drop of ink diffusing through a body of water. As more transactions accumulate on the blockchain, the tagged funds are diluted by combination with non-tagged funds, thus spreading out the weighting value into future transaction outputs. An identification of funds (e.g., funds deposited by a customer of a digital asset services provider) can be compared against the weighted transaction outputs to determine whether there is an intersection indicating economic interaction between the two parties. Given a long enough time horizon, in theory, all transaction outputs could eventually come into contact with one another (analogous to the ink drop in eventually becoming fully mixed with the body of water). Thus, a minimum weight value threshold may be imposed to satisfy an intersection condition between the identified funds and the tagging profile.

As used herein, an "identification of funds" is an initial identification of funds on the blockchain that can be made in several ways. In one implementation, the identification of funds includes one or more transaction outputs, whether spent or not. In other implementations, the identification of funds could include an extended public address (also known as an xpub) that deterministically creates an infinite line of payment address. Cryptocurrency wallets often use an xpub, often generated based on a deterministic seed, to be able to generate all the payment addresses that will ever be used by the wallet. However the initial identification of funds is made, these initial transaction outputs can be compared against the global transaction history of the blockchain to generate a list of transaction outputs that are children of the initial identification of funds, referred to herein as the spending history of the identification of funds. It would not be known how much of the funds in the spending history is retained by the entity that originally controlled the identified funds compared to funds in the spending history that are sent to recipients due to the nature of the blockchain.

As used herein, a "tagging profile" is a set of funds that is similar to the identification of funds, but with a weight value associated therewith. An example weight value could be a risk value attached to or associated with each transaction output in the tagging profile. When funds included in the tagging profile are spent or combined with other transaction outputs to form inputs to a new transaction, the weight values can be inherited by the resulting new transaction outputs. The tagging profile therefore resembles the diffusing ink in the body of water such that weight values can be diluted according to the magnitude of unweighted transaction outputs that are "mixed in" with the weighted transaction outputs. The resulting set of funds with weighting values after the tagging profile has been applied to the global transaction history is referred to herein as the propagation profile.

As an example, funds on the blockchain could be deemed "tainted" and thus undesirable or prohibited to handle from a legal or regulatory perspective. For example, funds could be reported as having been stolen, associated with an unlawful entity, deemed associated with an entity subject to trade sanctions, or any number of other reasons. In this scenario a weight value representing "risk," or a similar concept, can be assigned to the tainted funds. As the tainted funds are spent and combined with fresh funds (e.g., funds not associated with a weighting value), the new transaction outputs inherit the weight values from the tainted funds proportionally according to the fraction of input value to new transactions represented by the tainted funds.

If the tainted funds are not mixed with fresh funds, then any new transaction outputs will retain the weight values of the parent transaction outputs. Thus, if stolen funds are sent directly to a digital asset services provider, the digital asset services provider may refuse to accept the funds assuming the weight values are above the digital asset service provider's risk threshold. Since the risk threshold is adjustable, a digital asset service provider can specify what level of exposure to tainted funds is tolerable. Likely any market participant will find it necessary to have some non-zero level of risk on the funds, similar to the case for physical cash or other types of money that have been involved in prohibited activities before coming into possession of a market participant.

The system and methods for tracing flow of tagged funds on a blockchain disclosed herein are a practical application of blockchains. From one point of view, the tagging schema disclosed herein is an attack on the fungibility of the cryptocurrency, which is often viewed as a core source of value for the coins. If some funds are labeled as "tainted" or "at risk" as described herein, then those coins may trade at a discount on the market compared to "clean" funds. Tracing funds on a blockchain by developing a propagation profile, thus has a real-world effect on participants wishing to transact in the coins: cryptocurrency deposits may be returned, a customer could be denied service, law enforcement authorities could be notified, etc.

Nor are the systems and methods disclosed herein merely organizing information. In a blockchain cryptocurrency system, private signing keys (also referred to herein as spending keys) are needed to move funds. By design, a signing key only exists in the possession of the participant who created it. If it were otherwise, it would be computationally practical to steal another participant's coins. The private signing key, therefore, is not merely information, the private signing key is the money itself. When a participant is in possession of a private signing key, that participant takes on the responsibility and obligation to protect the key against loss of funds. The history of cryptocurrency is littered with centralized digital asset services providers who lost signing keys, and therewith the coins, whether to theft, incompetence, or other reasons. Receiving digital asset funds is therefore more akin to receiving a shipment of a precious metal than it is to receiving an electronic transmission. Electronic transmissions can typically be copied and retransmitted at much as desired; blockchain funds, on the other hand, cannot. The stopping of a digital asset payment, or the rejection and return of a digital asset payment, is therefore more than merely transmitting data due to the custodial responsibilities involved.

FIG. 1 is a block diagram 100 of an example relationship between a source of funds and an auditor tracing the flow those funds with respect to a tagging profile on a blockchain. In the example illustrated in FIG. 1, a blockchain 102 is an unspent transaction output (UTXO) model blockchain wherein each new block added to the chain spends a subset of available UTXOs as transaction inputs and creates new, previously nonexistent, UTXOs as transaction outputs. The blockchain 102 thus represents a global transaction history for users of the chain.

An auditor 106 receives a tagging profile 110 identifying funds with weighting values associated therewith (e.g., a set of transaction outputs with risk values). The auditor 106 further received an identification of funds 108 from a participant 104. The identification of funds illustrated in FIG. 1 is a set of xpubs each representing a cryptocurrency wallet of interest to the participant 104. The wallets of interest to the participant may represent customer wallets, business counterparty wallets, etc.

Upon receipt of the tagging profile 110 and the identification of funds 108, the auditor 106 generates the spending history and propagation profile based thereon and searches for funds (e.g., transaction outputs) that appear in both sets. If there are funds in both sets, then the auditor 106 determines whether the funds satisfy an intersection condition, which may rely on the weighting value of intersecting funds exceeding a minimum threshold, such as a threshold supplied by the participant 104. The auditor may then take action, such as transmitting an intersection alert to the participant 104.

Figure 2:
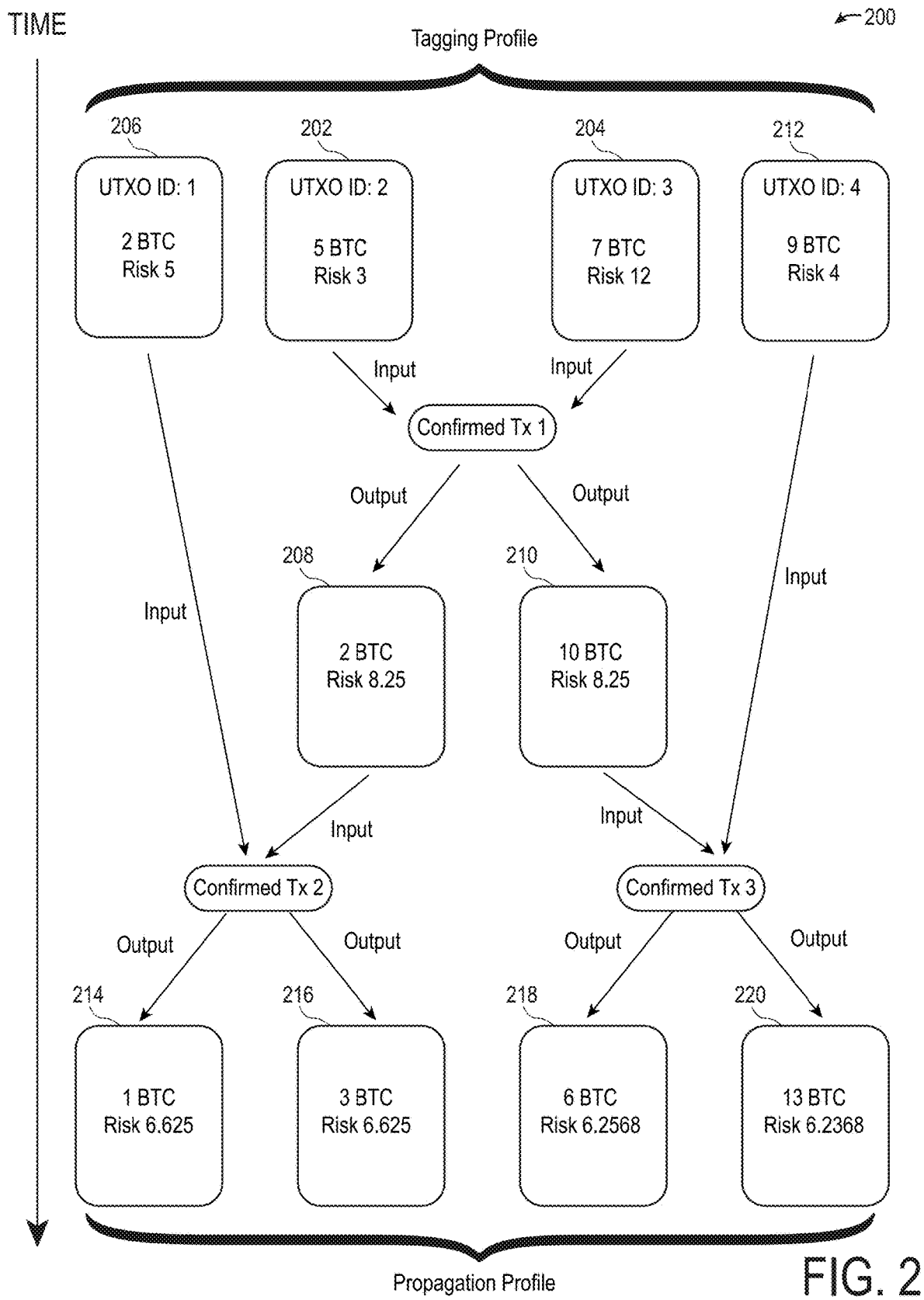
FIG. 2 is a time-series diagram of a tagging profile replayed against a global transaction history over time on a blockchain shared ledger to yield a propagation profile of unspent transaction outputs.

FIG. 2 is a time-series diagram 200 of a tagging profile replayed against a global transaction history over time on a blockchain shared ledger to yield a propagation profile of unspent transaction outputs. At the outset, clarification may be useful regarding the term "unspent" in UTXO. A transaction may be unspent at a certain point in time, but then later is consumed as an input to a confirmed transaction, thus becoming "spent." These transaction inputs/outputs are commonly referred to as UTXOs whether they are spent or not. For purposes of this disclosure, a UTXO can refer to either a spent or unspent transaction output. Similarly, a transaction "output" is created by a confirmed transaction, but later can be used as an input to another transaction. Thus, UTXO should not be interpreted as strictly a transaction output.

The tagging profile in the example illustrated in FIG. 2 includes four UTXOs 202, 204, 206, and 212. Each UTXO in the tagging profile has a funds value and a weight value associated therewith. For example, UTXO 202 has 5 bitcoins (BTC) and a weight value, here a risk score, of 3. The remaining UTXOs 204, 206, and 212 similarly have funds values and risk scores. Taken together, the four UTXOs 202, 204, 206, and 212 represent the tagging profile in this example.

As time progresses downward in the diagram 200, the UTXOs 202 and 204 are inputs to a confirmed transaction Tx 1. Confirmed transaction Tx 1 generates two transaction outputs 208 and 210. Funds values may be apportioned as desired by the sender between the two outputs 208 and 210 but must not exceed the total value of the inputs to Tx 1. In practice, there would also be a transaction fee paid to the miner who solved the block in which Tx 1 is included, but transaction fees are ignored for the purposes of this example.

In a typical scenario, one of the outputs of Tx 1 is now owned by the payee of the transaction and the other output is the change address belonging to the sender. For purposes of generating the propagation profile, it does not matter which output is the payee's and which is the change address. The risk is apportioned across the outputs to Tx 1 according to the formula $((5*3)+(7*12))/(5+7)=8.25$. In the example of Tx 1, there are no "fresh" inputs (e.g., inputs without weight scores), such that the output weights can be viewed as changing the balance of the risk of the inputs but not reducing the overall risk as would be the case if a diluting zero-weight input had been used. One way to view the Tx 1 is that the total risk of the inputs was shared equally by the two outputs, regardless of the relative size of each output.

Next in the time progression of diagram 200 is confirmed Tx 2, which consumes UTXO 208 and UTXO 206. Tx 2 produces two outputs, UTXOs 214 and 216. As with Tx 1, the two transaction outputs each have a value, 1 BTC and 3 BTC, respectively, and share the same risk score of 6.625. Concurrent with confirmed Tx 2 is confirmed Tx 3, which consumes UTXOs 210 and 212 and produces new transaction outputs 218 and 220. As with the other transactions, Tx 3 produces outputs of different BTC funds values but equal risk scores. The set of UTXOs 214, 216, 218, 220 in the example illustrated in FIG. 2 is the propagation profile that resulted from replaying the tagging profile against a global transaction history.

Figure 3:
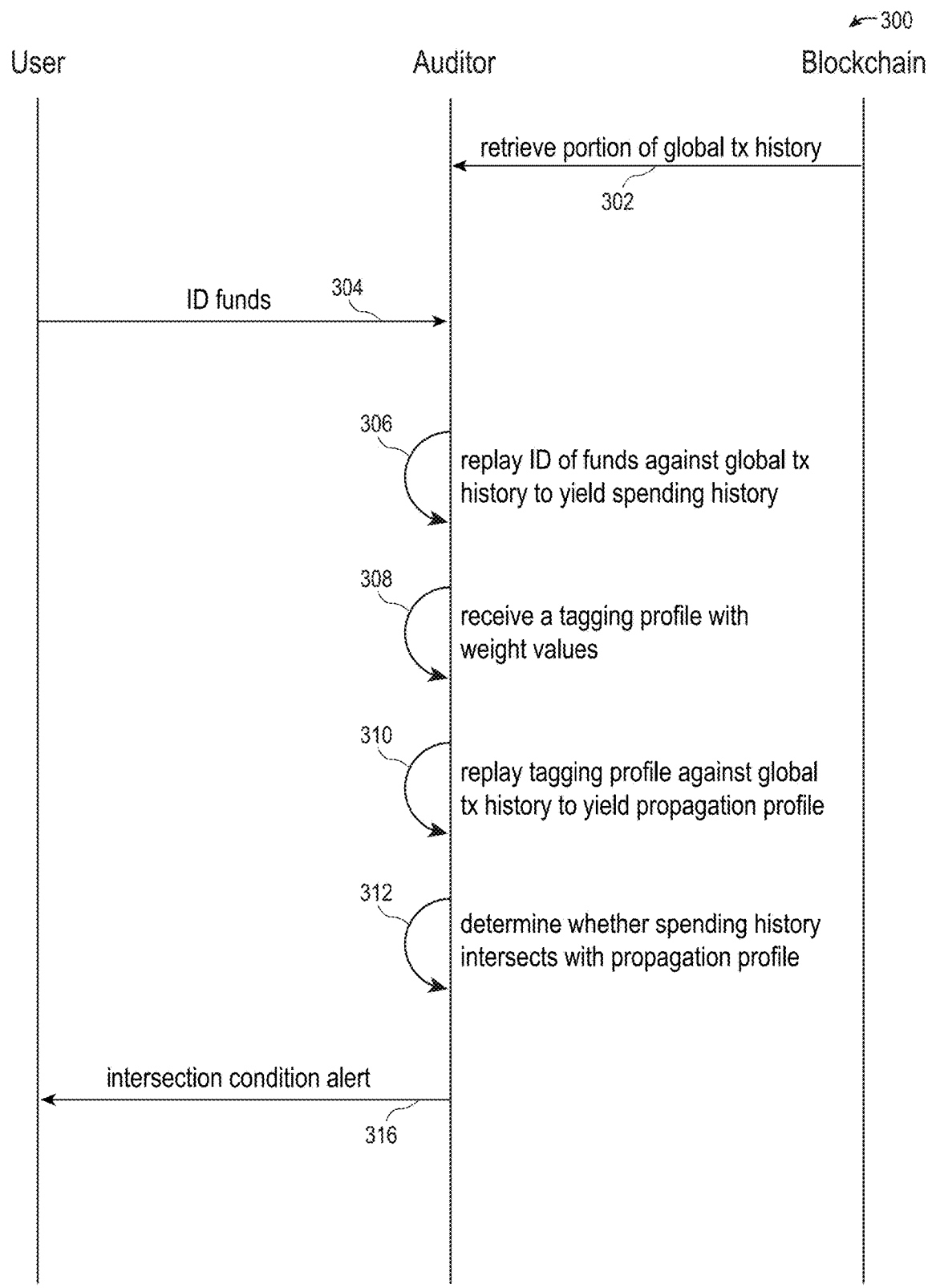
FIG. 3 is a signal diagram of a process of tracing the flow of tagged funds on a blockchain network.

FIG. 3 is a signal diagram of a workflow 300 of tracing the flow of tagged funds on a blockchain network. The workflow 300 begins with a receiving operation 302 wherein an auditor receives at least a portion of a global transaction history from a blockchain. In implementations, the auditor includes a full validating node on a network of the blockchain such that the auditor has access to a full history of the blockchain. In other implementations, the auditor receives only a portion of the blockchain record, such as via a third-party such as a block explorer website or API. In many cases, the history of the blockchain may span a long period of time (e.g., many years) and only a subset of the total history is of interest to the participants. Thus, a block height may be specified as a start block for purposes of the method described herein such that only blocks above the start block are considered.

A receiving operation 304 receives an identification of funds on the blockchain from a user. The identification of funds may include any information identifying funds in question, such as a set of transaction outputs, an xpub, etc. Once the auditor has the identification of funds, the auditor replays the identifier of funds against the global transaction history to generate a spending history. The process of replaying the identification of funds against the global transaction history is similar to the generation of the propagation profile except there is no weighting value. In implementations, all outputs descending from the identification of funds are considered to belong to the spending history. In other implementations, change addresses are identified as belonging to a wallet associated with the identification of funds distinct from recipient addresses, which are excluded from the spending history.

In some cases, an identification of funds will be "fresh" in the sense that the funds only exist at or near the tip of the blockchain. In other words, no blocks or very few blocks have been solved since the block height wherein the identification of funds first appeared on the blockchain shared ledger. This situation may occur when a new address has been created for the purpose of receiving the funds and it is known that the address had not existed prior due to the creation of the address with sufficient entropy input. In this scenario, the replaying operation 306 is a null operation because there is nothing in the global transaction history against which to replay the identification of funds. Examples may include wherein a digital asset services provider creates a new payment address into which a customer or prospective customer deposits funds for use with the digital asset services provider (e.g., making a deposit into a cryptocurrency exchange for trading, depositing digital asset collateral for a loan, depositing funds for use on a platform, etc.).

A receiving operation 308 receives a tagging profile including transaction outputs with weight values associated therewith. Another replaying operation 310 replays the tagging profile against the global spending history to yield a propagation profile. A determining operation 312 then determines whether there is an intersection between the spending history and the propagation profile by determining whether there exist any transaction outputs that are members of both sets. It is likely that mere membership in both sets will not be deemed sufficient to satisfy an intersection condition because, given enough time, virtually all funds can comingle on the blockchain. Thus, a minimum risk score for the intersecting funds may be required to filter out funds that are only minimally related between the two sets. Depending on the sensitivity of a market participant to tainted funds, the determining operation 312 may adjust the minimum threshold. For a tagging profile that applies to funds deemed truly toxic to the market participant, a minimum threshold approaching zero may be used.

Figure 4:
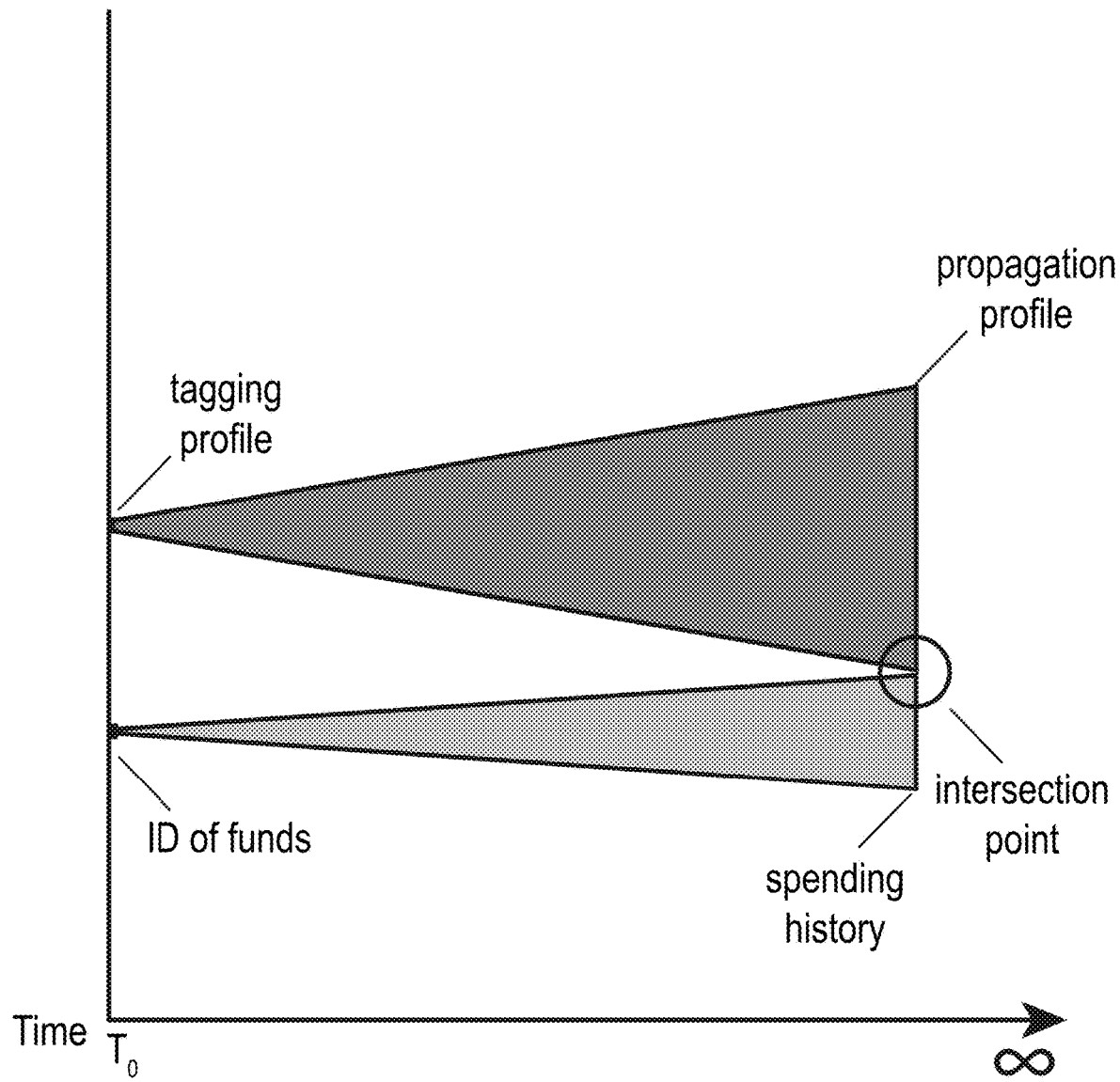
FIG. 4 is a time plot illustrating the creation of an example propagation profile from a tagging profile and the creation of a spending history from an identification of funds as each is replayed against a global transaction history.

FIG. 4 is a time plot 400 illustrating the creation of an example propagation profile from a tagging profile and the creation of a spending history from an identification of funds as each is replayed against a global transaction history. The horizontal x-axis of the plot 400 is time, starting at a time $T_0$ and extending indefinitely. In implementations, time $T_0$ represents the genesis block of the blockchain. In other implementations, time $T_0$ represents a start block, such as a block identified by block height at the beginning of an epoch of interest on the blockchain. In the example illustrated in plot 400, the tagging profile and the identification of funds originate are at the same block height, but different block heights are also possible.

The y-axis of FIG. 4 should not be interpreted to mean the transaction outputs are ordered. In both spent and unspent outputs are deemed to be represented by the y-axis, then the total size of the set increases over time but there is nothing inherent to the outputs that signifies ordering. Thus, the y-axis should be interpreted to mean the overall size of the transaction outputs and not the currency values thereof or any other attribute of the transaction outputs.

The cone extending to the right of the tagging profile at time $T_0$ represents the generation of the propagation profile as applied to the global transaction history as time increases. Expansion of the cone depicts a rising number of transaction outputs that are assigned a weight value as inputs are consumed by transactions and new outputs created. Not depicted in the plot 400 is the weighting value of the transaction outputs in the propagation profile, which may differ from output to output. Similarly, the cone extending to the right from the identification of funds represents the generation of the spending history as time progresses. The intersection point shows the first point at which a transaction output appears in both cones. This point may trigger the intersection condition, depending on whether the weight of the intersecting transaction output exceeds a triggering threshold. The intersection condition need not be only triggered at one point. If the cones continued to extend to the right, then there could be many intersecting transaction outputs over time, each of which can independently trigger the intersection condition. The plot 400 suggests that, as time increases to infinity, and identification of funds will eventually intersect with the propagation profile.

Figure 5:
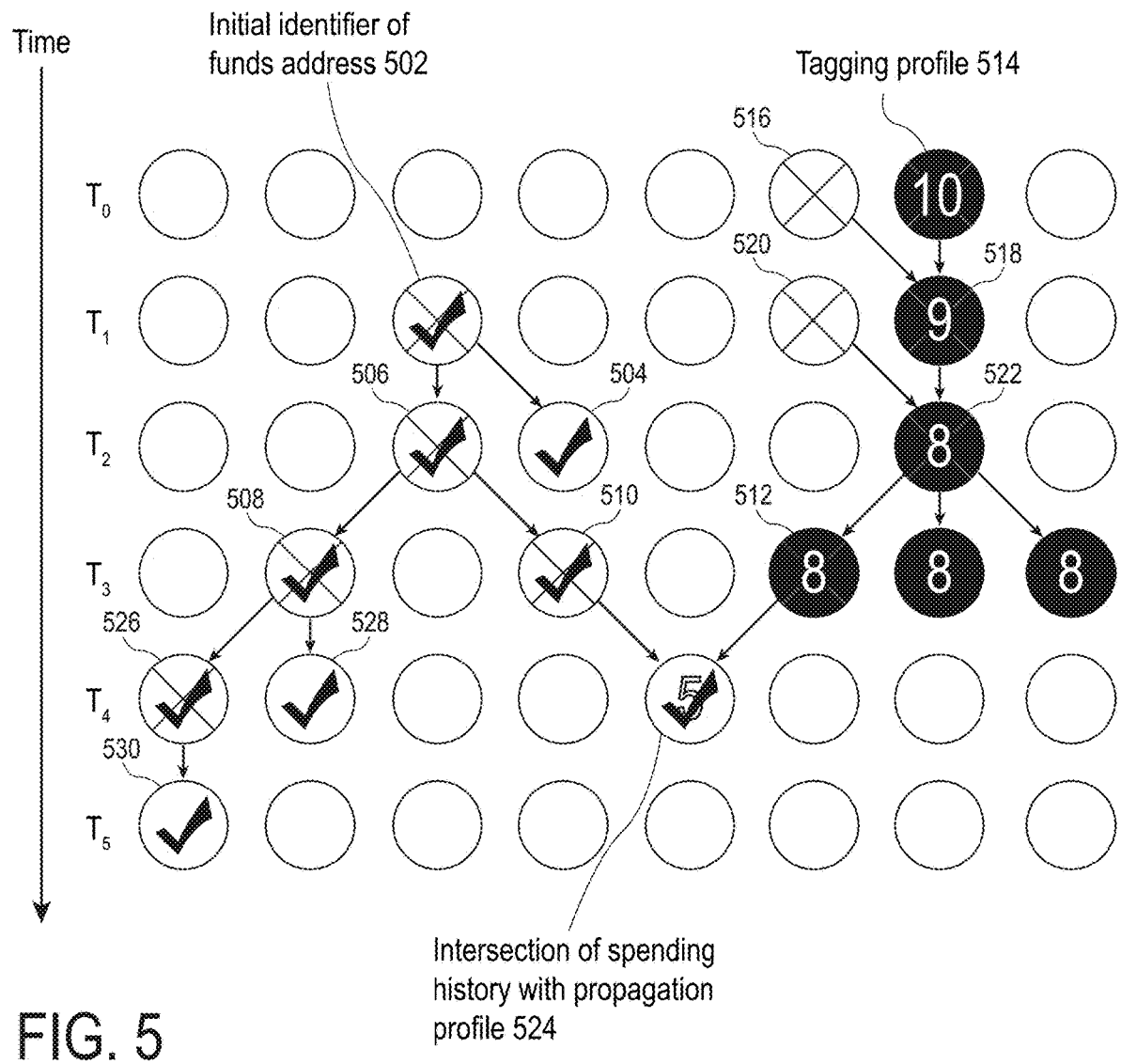
FIG. 5 is another time diagram illustrating an example relationship among blockchain addresses with an identifier of funds, a spending profile, a tagging profile, and a propagation profile.

FIG. 5 is another time diagram 500 illustrating an example relationship among blockchain addresses with an identifier of funds, a spending profile, a tagging profile, and a propagation profile. In the time diagram 500, time progresses downward as indicated by the times $T_1$, $T_2$, $T_3$, etc. In the diagram 500, each time level is depicted as having a transaction output set associated therewith. In the diagram 500, individual transaction outputs on the blockchain are depicted as circles. When the address is spent, then an X is drawn through the circle representing the address. If a payment address is unspent, then there is no X in the circle.

As in other examples disclosed herein, the term "output" is applied to any output of a confirmed blockchain transaction, but it should also be appreciated that the "output" may then become an input to a later confirmed blockchain transaction. Thus, "output" should not be construed to mean strictly a blockchain transaction output but could also refer to an input. Similarly, the term "unspent" may refer to a transaction that later may be spent. Blockchain transaction outputs may also be referred to herein as addresses or payment addresses.

The identification of funds is represented by circle 502. In FIG. 5, outputs representing the spending history of the identifier of funds include a check mark. Unspent outputs are represented by a circle, spent output are crossed out, and outputs with a weighting value attached as part of the tagging profile and/or the propagation profile include a number indicating the weighting assigned thereto.

On the left side, FIG. 5 illustrates replaying the identification of funds against a global transaction history over time to generate the spending history of the identification of funds. In this example, the identification of funds is made by reference to a single unspent payment address 502. At time $T_2$, the initial identifier of funds 502 is spent to fund a recipient address 504 and a change address 506. At time $T_3$, the change address 506 has been spent in a transaction yielding two new outputs 508 and 510. The transaction output 508 is illustrated as spent to outputs 526 (itself later spent to output 530) and 528, left unspent. None of the output resulting from spending output 508 intersect with the propagation profile.

Moving back up to time $T_3$, the transaction output 510 does intersect with the propagation profile when, at time $T_4$, output 510 is spent in combination with transaction output 512, which is a transaction output with a weight value attached thereto. The transaction 512 has a weight value associated therewith because it is a child transaction of the tagging profile 514, and is thus part of the propagation profile. Although the initial tagging profile 514 may consist of any number of UTXOs, in the example illustrated in diagram 500 is a single UTXO with a weight value of 10. In an implementation, the weight value is on a scale of 0-10, thus the tagging profile 514 is a maximally weighted tagging profile. Such a high weight value may indicate funds that are high risk, such as funds that have been stolen from a cryptocurrency exchange.

Tracing the development of the propagation profile, at time $T_1$, the tagging profile UTXO 514 is spent as an input together with a UTXO 516 that does not have a weight value to produce new transaction output 518. The funds value of the output 516 is significantly lower than the output 514, thus resulting in a slight dilution of the weighting value to 9. The output 518 then becomes an input to another transaction together with UTXO 520, which also does not have a weighting value associated therewith. The input 520 has a comparatively lower BTC funds value, thus diluting the weighting again to 8 for the output of the transaction, output 522. Output 522 is spent as an input to a transaction creating three more outputs, including output 512, which, in turn, it spent as an input to a transaction combining it with output 510, part of the spending history. Thus, the first address satisfying the intersection condition is output 524.

Output 524 thus satisfies an intersection condition between the identifier of funds developed into the spending history, on the one hand, and the tagging profile developed into the propagation profile on the other hand. The intersection condition of output 524 has a value 5 associated therewith, reflecting that the size of input 510 is smaller than that of input 512. A participant interested in the intersection condition can use the intersecting value to reflect the degree of intersection (e.g., in the case of a "risk profile" weighting, how "tainted" the intersecting funds are). As time increases to infinity, it may become likely that virtually all blockchain outputs accrue some level of the weighting factor, due to the nature of the how the outputs are recombined as inputs to new transactions over the course of time on the blockchain. Thus, to have a value of relevance, intersection conditions may be limited to funds that have a weighting value above a threshold value, to "filter out the dust."

Figure 6:
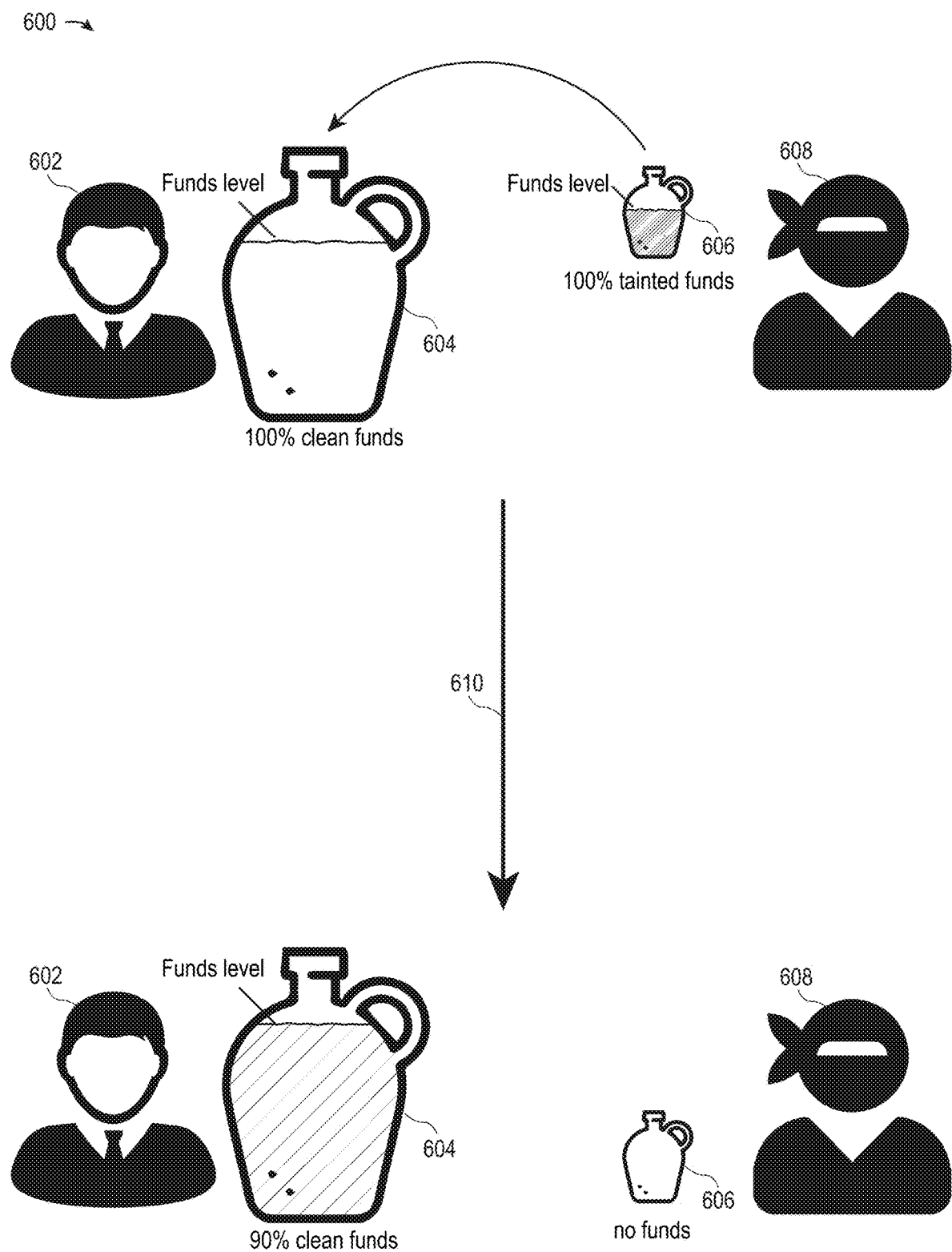
FIG. 6 is a diagram illustrating a dilution effect of combining clean funds with funds deemed tainted according to a tagging profile.

FIG. 6 is a diagram 600 illustrating a dilution effect of combining clean funds 604 with funds deemed tainted 606 according to a tagging profile. Initially, a blockchain network participant 602 owns a set of funds 604 that are not associated with weight values from any tagging profile and/or propagation profile generated therefrom. A suspect participant 608 owns funds 606 that have a weighting value indicating a high level of risk. As the funds 606 themselves are tainted according to the tagging profile, the suspect participant 608 may encounter difficulty spending the funds 606 as desired. Accordingly, the suspect participant 608 may elect to sell the funds 606 to the network participant 602 to be diluted with the clean funds 604. If the participant 602 is aware of the tainted nature of the funds 606, then the network participant 602 may demand a below-market sale price to compensate for the dilution.

After the arrow 610, the clean funds 604 have acquired an amount of taint from the funds 606 and the suspect participant 608 has divested from the tainted funds. The diagram 600 shows that tainted funds may be absorbed into non-tainted funds with new weighting according to the relative size of the two sets of funds. In this example, the clean funds 604 are substantially larger than the tainted funds, thus after combination the formerly completely clean funds take on a small level of taint. Such a level may be acceptable to the network participant 602, depending on a desired plan to use the funds.

Figure 7:
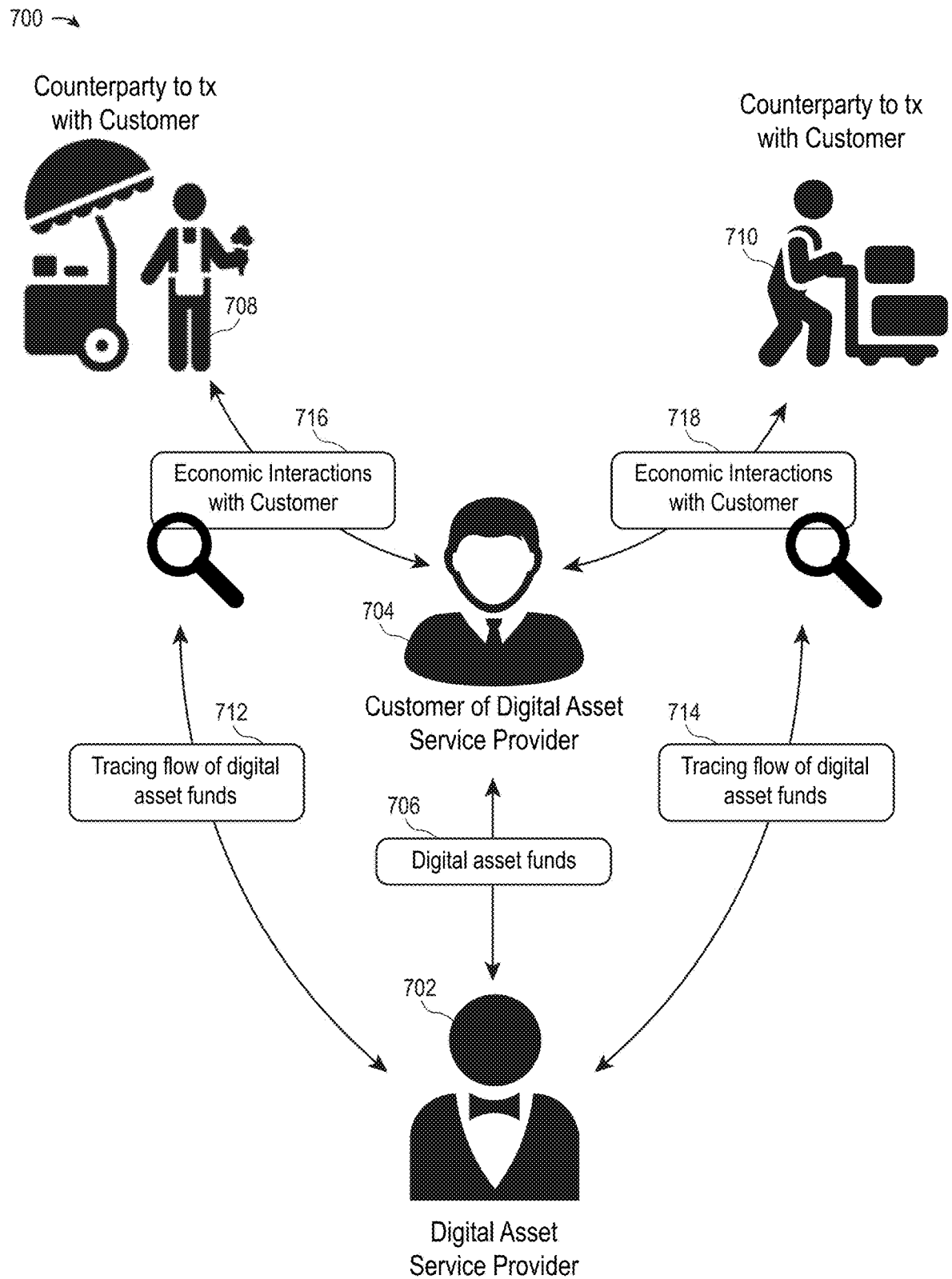
FIG. 7 is a diagram illustrating an example relationship among a digital asset services provider auditing the flow of blockchain funds of a customer with respect to counterparties to transactions with the customer.

FIG. 7 is a diagram 700 illustrating an example relationship among a digital asset services provider 502 auditing the flow of blockchain funds of a customer 704 with respect to counterparties 708 and 710 to transactions with the customer. Unlike the previous examples in this disclosure, the diagram 700 depicts a scenario wherein the tagging profile is not a risk profile, but rather a profile indicating how closely tied funds are to specific market participants 708 and 710. Funds known to be associated with a market participant can be tagged with a weighting value indicating the relationship (e.g., the highest weighting value possible). These funds are then diluted as they are combined with other, non-tagged funds. Over time the tagging profile will become less and less related to the original counterparty, but the level of interaction with these funds can still be used to indicate a probability that an interaction with customer funds 704 is performed by the counterparty in question.

In the example illustrated in FIG. 7, a customer 704 owns digital asset funds 706 held in custody by the digital asset services provider 702 (e.g., a custodial wallet service, a manager of a digital asset collateral wallet for a digital asset collateralized loan, a cryptocurrency exchange, and/or any other type of digital asset service provider). Whatever the type of service provided by the digital asset service provider 702, funds owned by the customer 704 may be traced, such as when the customer initiates a transaction from a custodial wallet.

In the example of FIG. 7, the customer 704 initiates a transfer 716 to the counterparty 708. If the transfer 716 occurs through the digital asset services provider 702 or if the transaction 716 is on-chain and thus visible on a copy of the blockchain ledger, the digital asset services provider 702 can identify the transaction 716 as part of the spending history of the user 704. Once the transaction 716 has been identified as part of the spending history of the user 704, then a tracing operation 712 can calculate the likelihood that the funds were spent with the counterparty 708. A similar process is followed with transaction 718 to counterparty 710 and tracing operation 714.

In the example of FIG. 7, the digital asset services provider 702 may infer multiple types of economic information regarding the user 704 and the counterparties 708 and 710. In one implementation, the digital asset services provider 702 can assemble a consumer profile of the customer 704 by detecting intersection conditions between the funds 706 and known tagging profiles of counterparties. In another implementation, the digital asset services provider 702 can detect new counterparties with whom the customer 704 has engaged in business by examining intersection conditions with previously unknown counterparties. If the digital asset services provider has many customers, then comparisons may be made of the respective spending histories to detect new counterparties.

Figure 8:
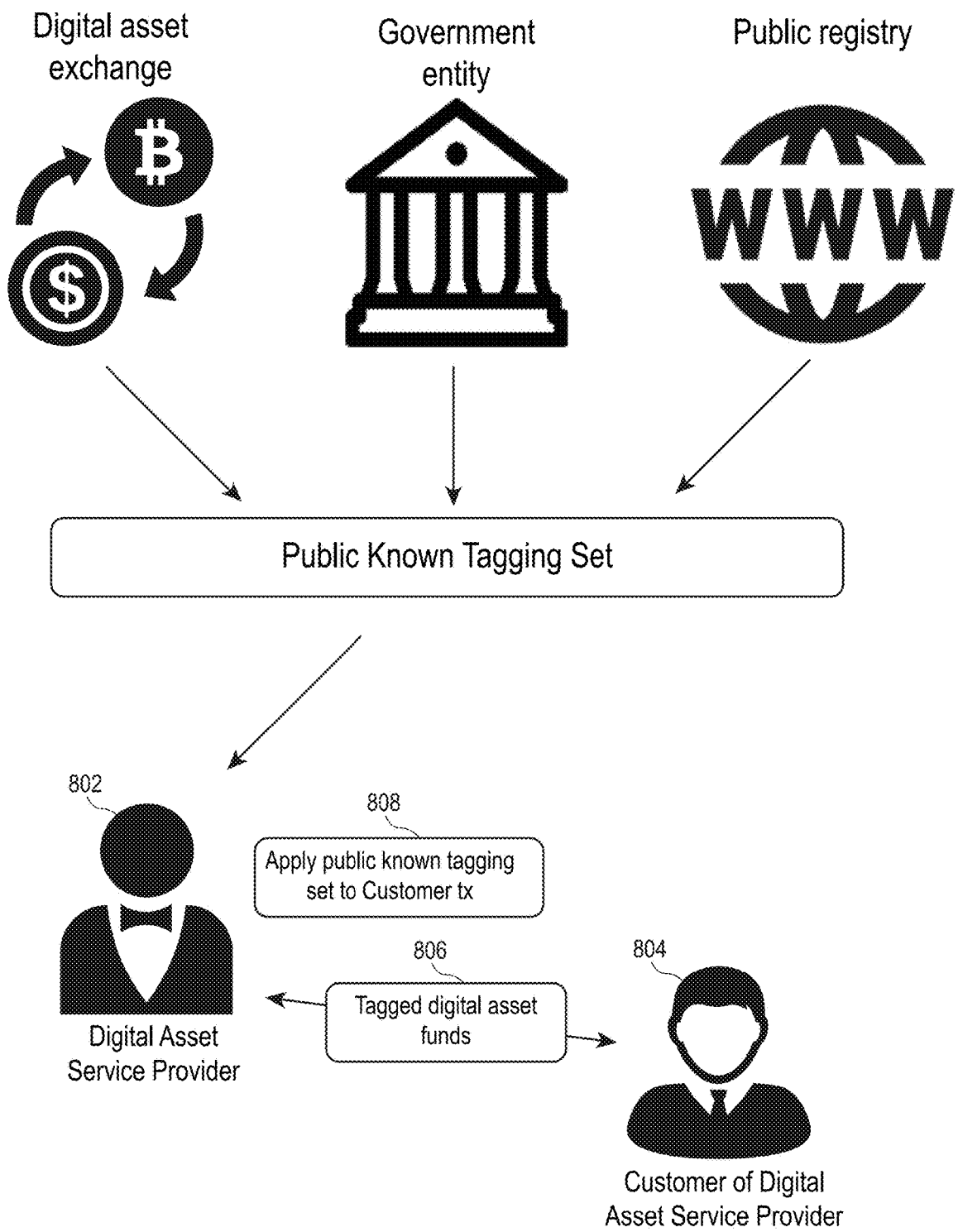
FIG. 8 is a diagram illustrating an example generation of tagging profiles by a digital asset services provider.

FIG. 8 is a diagram 800 illustrating an example application of tagging profiles by a digital asset services provider. There are various scenarios possible wherein the digital asset services provider 802 may want to, or be required to, refrain from handling certain funds. The profiling of these funds and weight values assigned thereto may be selected by a variety of participants and/or observers to the system. In one implementation, the tagging profile represents funds stolen from a cryptocurrency exchange. In the event of a theft, the exchange can publish a tagging profile wherein any funds taken by the attacks are identified by the relevant blockchain transaction outputs. The weighting values associated therewith may be chosen as high risk by the exchange according to a commonly accepted weighting scale (e.g., 0-10 with 10 being the most at risk funds) or the weighting may be chosen by the digital asset service provider 802 according to its own risk tolerance or standards imposed on the digital asset service provider 802 (e.g., a legal requirement not to handle stolen funds and a minimum threshold weighting score of 0.1). Other weighting propagation schemes are also possible, such as the "full blacklist" wherein any contact at all with the tagged funds and descendants thereof are assigned the same high weight value.

Other sources of the tagging profile and weightings may be supplied by a government entity, such as a government regulatory or enforcement agency. If a law enforcement agency deems blockchain funds to have been used in the commitment of a crime or to finance terrorism or in dealings with countries subject to economic sanctions, to take but a few examples, then the agency may have authority to tag those funds and impose restrictions or requirements on persons and/or businesses in the relevant legal jurisdictions regarding use of the funds should they come into contact. There is hardly any limit to the measures a state actor may take in an attempt to limit use of funds on a blockchain (especially a UTXO model blockchain). Any opponent of the state could be targeted and funds excluded from digital asset services providers, which could also include legacy financial system services providers, including without limitation tax collection enforcement targets, crime suspects, persons conducting business with entities of foreign origin, etc. The government entity may thus publish tagging profiles and require adherence thereto from the digital asset services provider 802.

Another example of the source of tagging profiles is a public registry. Funds known to have originated from undesirable sources may be collected and published. In some implementations, the customer 804 selects one or more tagging profiles from the public registry and requests the digital asset services provider 802 to apply the tagging profiles to any blockchain funds traced at the request of the customer 804. For example, if the customer 804 is the customer of an API service provided by the digital asset services provider 802 to check funds with which the customer 804 is considering interacting but wants to check a risk score first.

Figure 9:
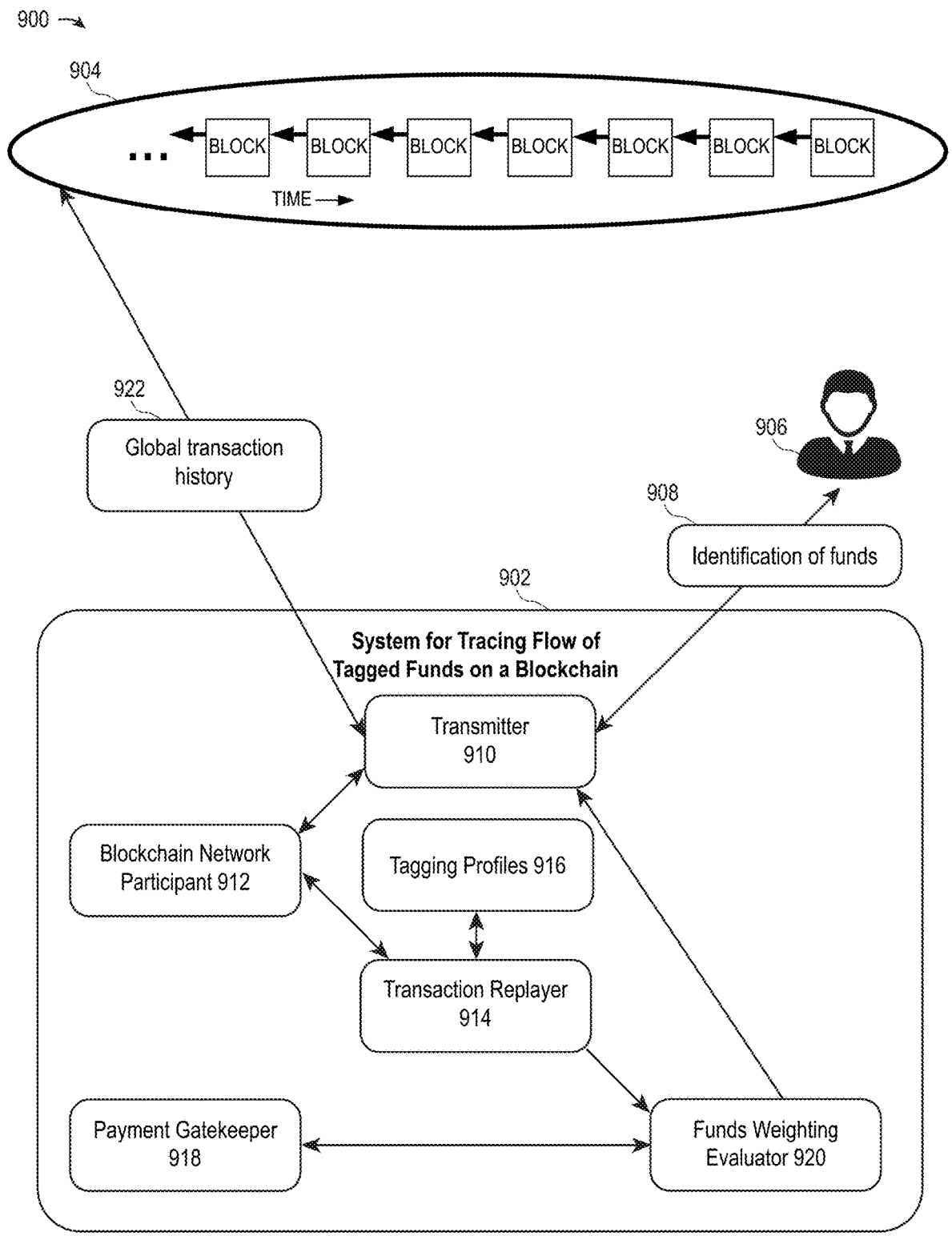
FIG. 9 is a block diagram of an example system for tracing flow of tagged funds on a blockchain.

FIG. 9 is a block diagram 900 of an example system 902 for tracing flow of tagged funds on a blockchain 904. The system 902 includes multiple components for carrying out the functions described herein. One such components is the transmitter 910, which can communicate with other participants (e.g., over the internet) and to receive certain pieces of information used in the system 902. One such type of communication is the identification of funds 908 from a participant 906. The participant 906 could be, for example without limitation, a customer of a digital asset services provider who has deposited funds into a wallet controlled by the digital asset services provider, a customer wishing to check funds for a business transaction with a third-party, etc.

The transmitter 910 also receives a global transaction history 922 from the blockchain 904. The transmitter 910 may receive the global transaction history pursuant to a request from the blockchain network participant 912. The blockchain network participant 912, in some implementations, is a full node participating in the network of the blockchain 904. A full node, in most cases, maintains a full (or in some cases, pruned) copy of the full shared ledger of the blockchain. Receipt of the global transaction history 922 in this case means receiving constant updates from other full node of pending transactions (e.g., the mempool) and solved blocks. As each new block is added to the chain, the global transaction history is thus updated. The blockchain network participant may further apply the consensus rules of the blockchain 904 to all newly received transactions and blocks and reject any transaction or block that does not comply therewith. In other implementations, the blockchain network participant 912 is not a full node. The participant 912 could alternatively or additionally be a client that requests and searches a copy of the blockchain, such as by requesting from a third-party block explorer.

The system for tracing funds 902 obtains tagging profiles 916. The tagging profiles may be generated locally at the system 902 and/or received from another source, such as the public list, the government enforcement list, stolen property list, or other published chosen criteria. The tagging profiles 916 could arise from private information as well, such as tagged wallets known to belong to a commercial entity to profile on-chain interactions between the funds and the entity, especially with respect to a particular customer or user 906.

A transaction replayer 914 receives the tagging profiles 916 and the global transaction history (or relevant portion thereof) and identification of funds from the blockchain network participant 912. Equipped with these pieces, the transaction replayer can generate the spending history of the identifier of funds by replaying the identifier of funds against the global transaction history of the blockchain. The result, the spending history, includes the blockchain transaction outputs that resulted from confirmed transactions including the outputs identified by the identifier of funds. In implementations, the identifier of funds is the extended public address (xpub) from which a set of new outputs will be deterministically generated and can be thought of as a "wallet." In the case of an xpub, the spending history would include all the xpub generated address that exist on the blockchain 904 in addition to any outputs that are the result of a transaction that combines inputs with outputs generated based on the xpub.

The transaction replayer 914 also generates the propagation profile by replaying the tagging profile(s) against the global transaction history. Similar to generation of the spending history, generation of the propagation profile involves starting with a set of blockchain outputs (or an xpub) and finding additional outputs of interest that were combined with outputs arising from the tagging profile. Unlike generation of the spending history, however, generation of the propagation profile includes propagation of a weighting value. The tagged funds thus "dilute" as they move around the blockchain and combine with non-tagged funds. The degree of dilution depends on the size of the untagged funds mixed in. A relatively small amount will result only in a small dilution, whereas a relatively large amount mixed in will produce greater dilution.

The term global transaction history as used herein essentially is the blockchain itself since the blockchain represents incremental updates to a shared ledger. Some blockchains could be pruned, meaning all spent outputs are discarded and the network participant only works with the unspent outputs (e.g., the UTXO set). Such a pruned chain could miss intersections between the tagging profile and the spending history. If only the UTXO set is considered, then a dilution level of any tagged funds may differ from the dilution level of the funds upstream. Nonetheless, implementations may chose to only handle the UTXO set, thus giving a "current snapshot" of the intersection of the spending history with the propagation profile, and not a historical record of the same.

After the transaction replayer 914 has generated the spending history and the propagation profile, the funds weighting evaluator 920 determines whether an intersection condition is satisfied. As was noted herein, over long periods of time, it is possible that a large and significant portion of all the funds on the chain 904 acquire some weighting level. As a large intersecting set may be of diminished utility in determining how closely related identified funds are to weighted funds, the funds weighting evaluator 920 may act as a filter to remove intersecting funds wherein the weight level is below a minimum threshold.

If the funds weighting evaluator 920 determines an intersection condition does exist, there may be triggers set such that the intersection causes another event to fire. In one implementation, a payment gatekeeper 918 forms and broadcasts a blockchain transaction in response to the intersection condition. Examples of triggers may be when funds deposited by a customer 906 with a digital asset service provider are deemed to intersect with stolen funds. In this case, the digital asset service provider may be required to not interact with the funds. Accordingly, the payment gatekeeper 918 may generate a blockchain transaction returning the funds to the sender. In other words, by signing a new, valid blockchain transaction with an output known to be associated with the customer 906 who deposited the funds (e.g., a known return address, an address known to have been generated as part of a wallet controlled by the customer 906, etc.).

Another example of a trigger based on intersection of the spending history with the propagation profile is a notification alert sent to a participant. Since intersecting funds with a propagation profile are likely to trigger an event, a notification of the event or an alert may be performed by the transmitter 910 to inform the network participant of the event. For example, if funds deposited by the customer 906 are to be returned, then the customer 906 likely wishes to be notified of this fact. Other examples may include without limitation a lender who accepts digital asset collateral for a loan with minimum loan-to-value ratio (LTV) requirements wherein a borrower may attempt to improve the LTV by depositing digital assets that may not be credited to the customer 906 due to a weighting value above the acceptable threshold.

Other examples of a trigger based on intersection of the spending history with the propagation profile include assembly of a profile of the customer 906. If the customer 906 receives funds from a digital asset services provider (e.g., withdrawal from a cryptocurrency exchange), then the digital asset services provider may be interested to know about economic interactions between the customer 906 and other entities using the withdrawn funds. For example, if funds identified as withdrawn by the customer 906 and thus under control of the customer 906 end up intersecting with a known hot wallet of a large online retailer, then the digital asset services provider can profile the user 906 as a customer of the large online retailer, assuming the weight of the intersecting funds is deemed high enough. This information is especially easy to glean based on known hot and cold wallets of popular cryptocurrency exchanged.

Of course, intersection of the funds withdrawn by the customer 906 intersecting with another known wallet do not mean the customer 906 himself interacted economically with the known hot wallet. It is also possible the customer 906 spent funds to a third-party, who then spent the funds to the known wallet. In this case, the customer 906 is profiled as having been economically closely located to the known wallet, even if the interaction is not direct. In this way, a "heat map" of the economic position of the customer 906 can be made, even if the direct and/or indirect nature of the interaction is not directly known.

Figure 10:
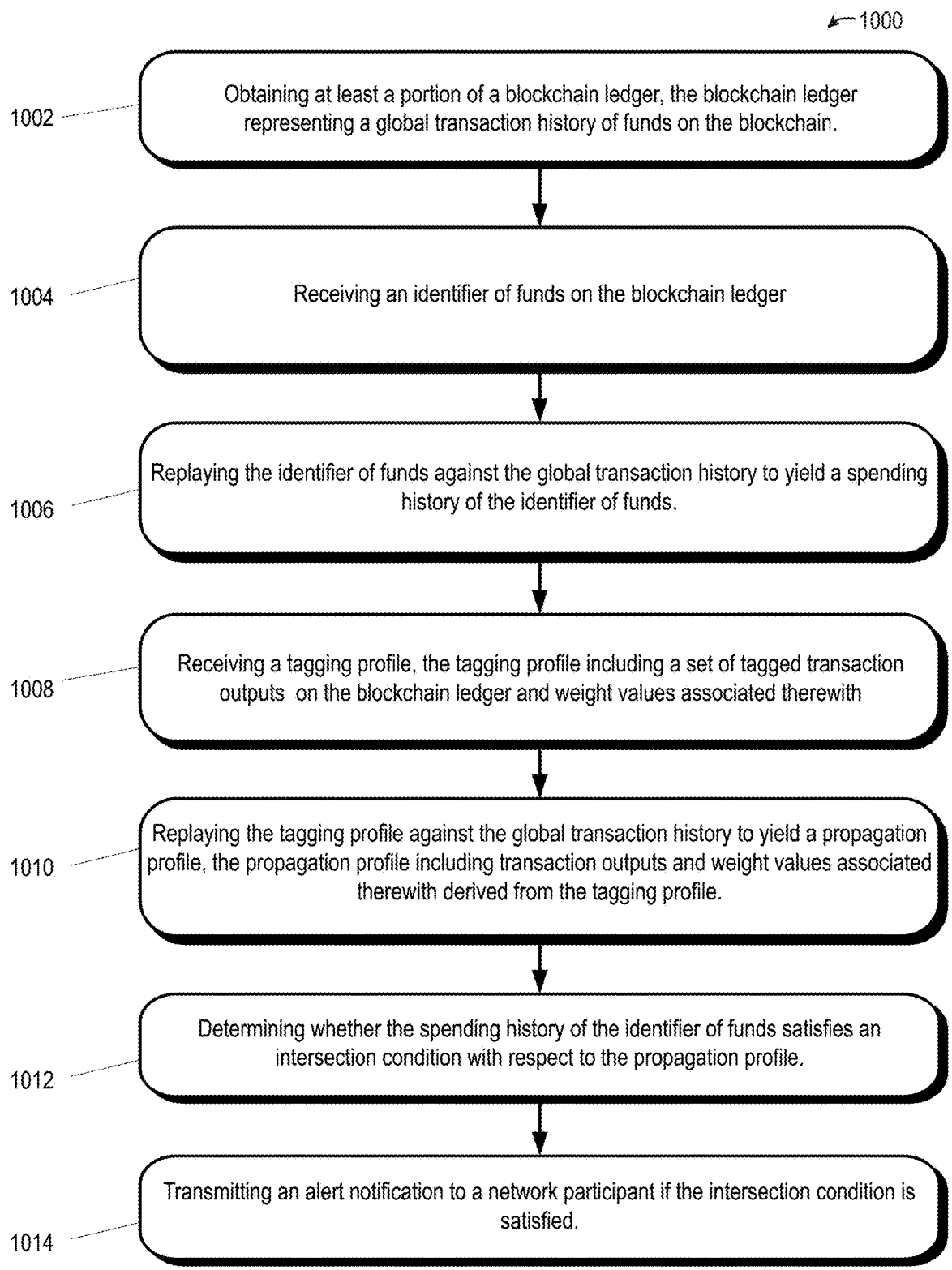
FIG. 10 is a flowchart of an example workflow for tracing flow of tagged funds on a blockchain.

FIG. 10 is a flowchart 1000 of an example workflow for tracing flow of tagged funds on a blockchain. An obtaining operation 1002 obtains at least a portion of a blockchain ledger, the blockchain ledger representing a global transaction history of funds on the blockchain. One way to limit the operation to a portion of the shared ledger is to specify a blockheight representing the earliest point in time on the blockchain of interest. A receiving operation 1004 receives an identifier of funds on the blockchain ledger. Ways to identify the funds include the xpub of a wallet, and/or one or more blockchain transaction outputs.

A replaying operation 1006 replays the identifier of funds against the global transaction history to yield a spending history of the identifier of funds. The spending history includes the spent and unspent outputs arising from transactions into which identified funds were inputs. In some cases, the identifier of funds will be near or at the tip of the chain. For example, when a newly created output (e.g., the output was introduced to the blockchain in a recently mined block) is the identifier of funds. In the case of a very "fresh" identifier of funds, the replaying operation can be or resemble a null operation. In other words, the portion of the global transaction history against which the identifier of funds is to be replayed is itself a null set. In this case, the replaying operation 1006 may be merely checking for new transactions involving the identifier of funds in the global transaction history without finding any, and thus the output of the replay operation is the identifier of funds itself.

A receiving operation 1008 receives a tagging profile, the tagging profile including a set of tagged transaction outputs on the blockchain ledger and weight values associated therewith. In one implementation, the weight values are risk values assigned according to association of the funds in the tagging profile with illegal and/or undesirable activity. In other implementations, the weight values indicate how closely the tagging profile is associated with a particular business entity or industry sector for the purpose of drawing inferences about the spending of the funds. Another replaying operation 1010 replays the tagging profile against the global transaction history to yield a propagation profile, the propagation profile including transaction outputs and weight values associated therewith derived from the tagging profile. The propagation profile may, for example, inherit weight values according to the relative weight of the blockchain outputs used as inputs to a transaction resulting in the propagation profile.

A determining operation 1012 determines whether the spending history of the identifier of funds satisfies an intersection condition with respect to the propagation profile. The intersection condition may be satisfied if any of the spending history shares an output with an output of the propagation profile having a weight value above a threshold. A transmitting operation 1014 transmits an alert notification to a network participant if the intersection condition is satisfied. The alert notification may alert the participant to a condition, such as the detection of an intersection with a propagation profile developed from a chosen tagging profile, whether funds are being moved based on the intersection condition, etc.

Figure 11:
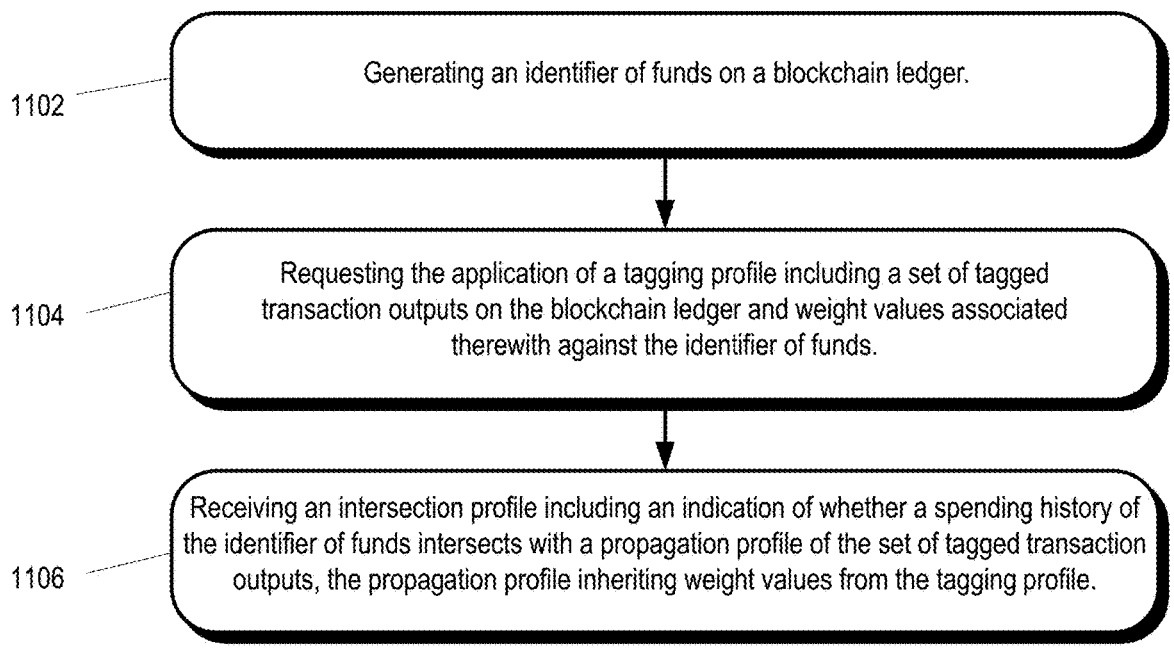
FIG. 11 is another flowchart of an example workflow for tracing flow of tagged funds on a blockchain

FIG. 11 is another flowchart 1100 of an example workflow for tracing flow of tagged funds on a blockchain. A generating operation 1102 generates an identifier of funds on a blockchain ledger. Examples of identified funds may include funds deposited by a customer, funds dispersed to a customer, funds identified by a user of an API, etc. A requesting operation 1104 requests the application of a tagging profile including a set of tagged transaction outputs on the blockchain ledger and weight values associated therewith against the identifier of funds. The requesting operation 1104 may, for example, a request via an API to a digital asset services provider to trace funds on a blockchain. In other words, the digital asset services provider in this scenario is a provider of funds tracing services.

A receiving operation 1106 receives an intersection profile including an indication of whether a spending history of the identifier of funds intersects with a propagation profile of the set of tagged transaction outputs, the propagation profile inheriting weight values from the tagging profile. The intersection profile may indicate which blockchain outputs intersected with propagation profile elements and what the resulting weight values are. Aggregate data on the amount and extent of the intersection may be included in the intersection profile (e.g., mean, median, mode weight values, etc.).

Figure 12:
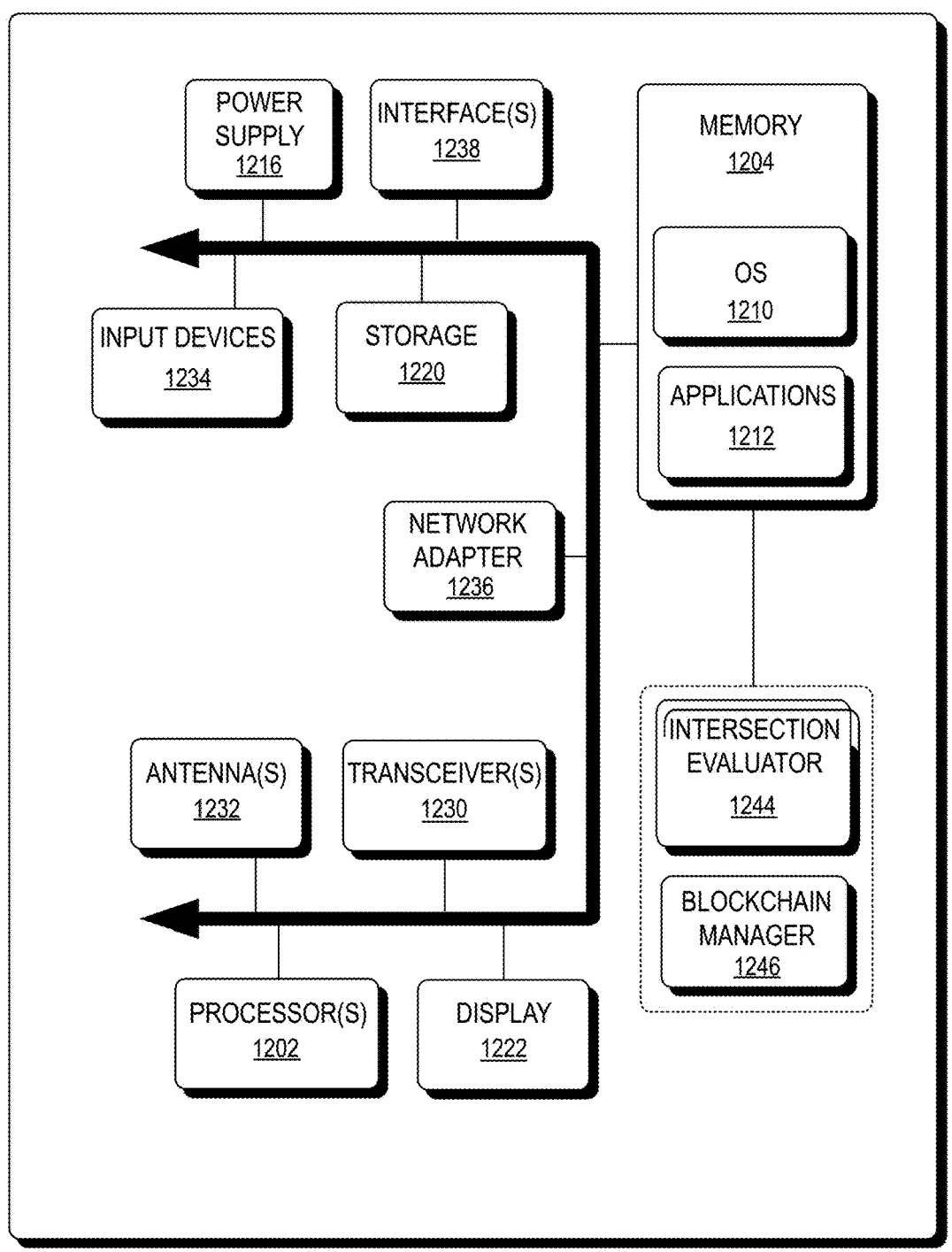
FIG. 12 is an example system that may be useful in carrying out the present disclosure.

FIG. 12 is an example system that may be useful in carrying out the present disclosure. FIG. 12 is a diagram of a system 1200 that may be useful for implementing a UTXO tagging system. FIG. 12 illustrates an example system (labeled as a processing system 1200) that may be useful in implementing the described technology. The processing system 1200 may be a client device, such as a smart device, connected device, Internet of Things (IoT) device, laptop, mobile device, desktop, tablet, or a server/cloud device. The processing system 1200 includes one or more processor(s) 1202, and a memory 1204. The memory 1204 generally includes both volatile memory (e.g., RAM) and non-volatile memory (e.g., flash memory). An operating system 1210 resided in the memory 1204 and is executed by the processor 1202.

One or more application programs 1212 modules or segments, such as oracle manager 944 and blockchain manager 1246 are loaded in the memory 1204 and/or storage 1220 and executed by the processor 1202. In some implementations, the graph generator 1244 is stored in read-only memory (ROM) 1214 or write once, read many (WORM) memory. Data such as extrinsic event data sources may be stored in the memory 1204 or storage 1220 and may be retrievable by the processor 1202 for use by oracle manager 1244 and the blockchain manager 1246, etc. The storage 1220 may be local to the processing system 1200 or may be remote and communicatively connected to the processing system 1200 and may include another server. The storage 1220 may store resources that are requestable by client devices (not shown). The storage 1220 may include secure storage such as one or more platform configuration registers (PCR) managed by one or more trusted platform modules (TPMs), which may be implemented in a chip or by the trusted execution environment (TEE).

The processing system 1200 includes a power supply 1216, which is powered by one or more batteries or other power sources and which provides power to other components of the processing system 1200. The power supply 1216 may also be connected to an external power source that overrides or recharges the built-in batteries or other power sources.

The processing system 1200 may include one or more communication transceivers 1230 which may be connected to one or more antenna(s) 1232 to provide network connectivity (e.g., mobile phone network, Wi-Fi®, Bluetooth®, etc.) to one or more other servers and/or client devices (e.g., mobile devices, desktop computers, or laptop computers). The processing system 1200 may further include a network adapter 1236, which is a type of communication device. The processing system 1200 may use the network adapter 1236 and any other types of communication devices for establishing connections over a wide-area network (WAN) or local area network (LAN). It should be appreciated that the network connections shown are exemplary and that other communications devices and means for establishing a communications link between the processing system 1200 and other devices may be used.

The processing system 1200 may include one or more input devices 1234 such that a user may enter commands and information (e.g., a keyboard or mouse). Input devices 1234 may further include other types of input such as multimodal input, speech input, graffiti input, motion detection, facial recognition, physical fingerprinting, etc. These and other input devices may be coupled to the server by one or more interfaces 1238 such as a serial port interface, parallel port, universal serial bus (USB), etc. The processing system 1200 may further include a display 1222 such as a touch screen display.

The processing system 1200 may include a variety of tangible processor-readable storage media and intangible processor-readable communication signals including in virtual and/or cloud computing environment. Tangible processor-readable storage can be embodied by any available media that can be accessed by the processing system 1200 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 1200. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

The invention claimed is:

1. A system for tracing flow of tagged funds on a blockchain, the system comprising:
   a blockchain network participant that operates as a full node in a network of the blockchain, the blockchain network participant being configured to obtain at least a portion of a blockchain ledger representing a global transaction history of funds on the blockchain;
   a transmitter at which to receive an identifier of funds on the blockchain ledger and a tagging profile including a set of tagged transaction outputs on the blockchain ledger and weight values associated therewith pursuant to a request from the blockchain network participant, wherein each of the weight values is indicative of an amount of the funds included in a corresponding one of the set of tagged transaction outputs;
   a transaction replayer that is representative of a first application program that is executable by the system, the transaction replayer being configured to
      replay the tagging profile against the global transaction history to yield a spending history of the identifier of funds, and
      replay the tagging profile against the global transaction history to yield a propagation profile;
   a funds weighting evaluator that is representative of a second application program that is executable by the system, the funds weighting evaluator being configured to determine whether the spending history of the identifier of funds satisfies an intersection condition with respect to the propagation profile; and
   a payment gatekeeper that is representative of a third application program that is executable by the system, the payment gatekeeper being configured to block a requested transaction if the intersection condition is satisfied and issue a new transaction so as to return funds associated with the requested transaction.

2. The system of claim 1, wherein the transmitter sends an alert notification to a market participant if the intersection condition is satisfied.

3. The system of claim 1, wherein the tagging profile is based at least in part on an identification of stolen funds.

4. The system of claim 1, wherein the tagging profile is based at least in part on funds associated with a market participant and the alert notification indicates an economic interaction between funds in the spending history of the identifier of funds with the market participant.

5. The system of claim 1, wherein the blockchain network participant includes a node on the blockchain network and the global transaction history of funds on the blockchain is local to the node.

6. The system of claim 1, wherein the identifier of funds and the spending history are equivalent.

7. The system of claim 1, wherein the intersection condition is satisfied only if a weight value of a transaction output in the spending history of the identifier of funds intersects with a transaction output in the propagation profile having a weight value above a trigger threshold.

8. The system of claim 1, wherein the transaction replayer assigns an equal weighting value to any outputs from a transaction in the global transaction history wherein at least one input to the transaction is associated with a weighting value.

9. The system of claim 1, wherein the tagging profile includes a blacklist of transaction outputs.

10. The system of claim 1, wherein the identifier of funds includes a set of transaction outputs derived from an extended public key (xpub).

11. The system of claim 1, wherein the identifier of funds includes a block height on the blockchain.

12. A system for tracing flow of tagged funds on a blockchain, the system comprising:
- a blockchain network participant that operates as a client able to request and search a copy of the blockchain, the blockchain network participant being configured to obtain at least a portion of a blockchain ledger representing a global transaction history of funds on the blockchain;
- a transmitter at which to receive an identifier of funds on the blockchain ledger and a tagging profile including a set of tagged transaction outputs on the blockchain ledger and weight values associated therewith pursuant to a request from the blockchain network participant, wherein each of the weight values is indicative of an amount of the funds included in a corresponding one of the set of tagged transaction outputs;
- a first application program that, when executed, replays the tagging profile against the global transaction history to yield a spending history of the identifier of funds and a propagation profile;
- a second application program that, when executed, determines whether the spending history of the identifier of funds satisfies an intersection condition with respect to the propagation profile; and
- a third application program that, when executed,
  - blocks a requested transaction if the intersection condition is satisfied, and
  - issues a new transaction so as to return funds associated with the requested transaction.

* * * * *